United States Patent [19]

Breese

[11] 3,883,128

[45] May 13, 1975

[54] UNIVERSALLY ADJUSTABLE CLAMP

[76] Inventor: Ralph J. Breese, Box 217, Bourbon, Mo. 65441

[22] Filed: Feb. 25, 1974

[21] Appl. No.: 445,540

[52] U.S. Cl. ............ 269/45; 269/101; 269/321 ME
[51] Int. Cl. .............................................. B25b 1/22
[58] Field of Search .......... 29/200 J, 200 P; 269/41, 269/43, 45, 97, 101, 203, 321 ME

[56] References Cited
UNITED STATES PATENTS

| 288,035 | 11/1883 | Dixon | 269/45 |
|---------|---------|-------|--------|
| 954,961 | 4/1919 | Higham | 269/97 |
| 1,670,253 | 5/1928 | Gilbert | 269/45 |
| 2,903,258 | 9/1959 | Jovanovich | 269/203 |

FOREIGN PATENTS OR APPLICATIONS

| 1,302,838 | 1962 | France | 269/45 |

OTHER PUBLICATIONS

Kirk, A. E. Twin Clamps Aid Welding. In Popular Science, p. 216, Nov. 1949.

*Primary Examiner*—Roy Lake
*Assistant Examiner*—Mark S. Bicks

[57] ABSTRACT

This clamping device includes a first angle bracket having a slotted outstanding vertical leg and a second angle bracket having a slotted outstanding horizontal leg. The second bracket is movably mounted to the outstanding leg of the first angle bracket and a C-clamp is mounted to the outstanding leg of each bracket. Each C-clamp includes a fixed, outwardly extending, threaded rod, which is received within the slot of the outstanding leg of its associated bracket for translational movement of the clamp along the length of the slot, and also perpendicularly of the slot, and rotational movement of the clamp about the axis of the rod.

2 Claims, 4 Drawing Figures

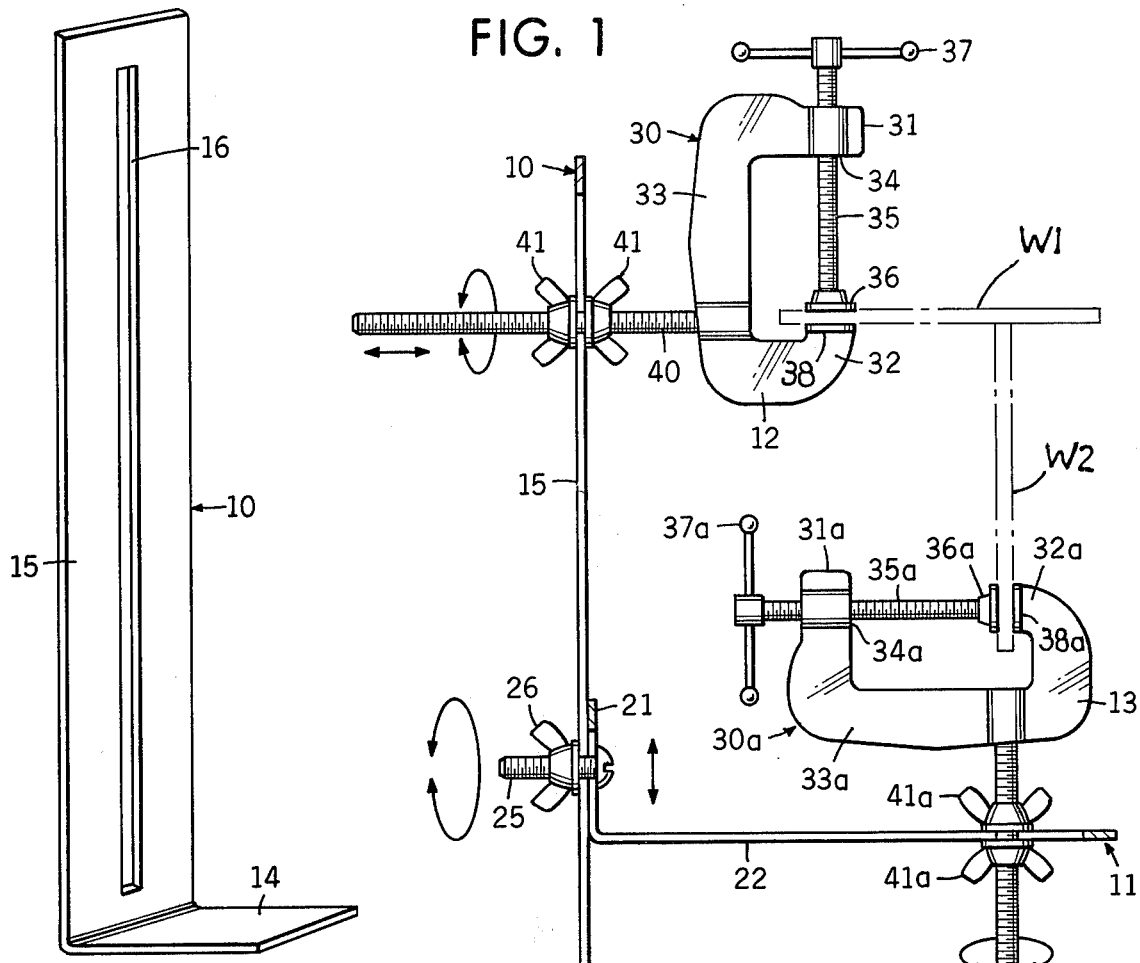
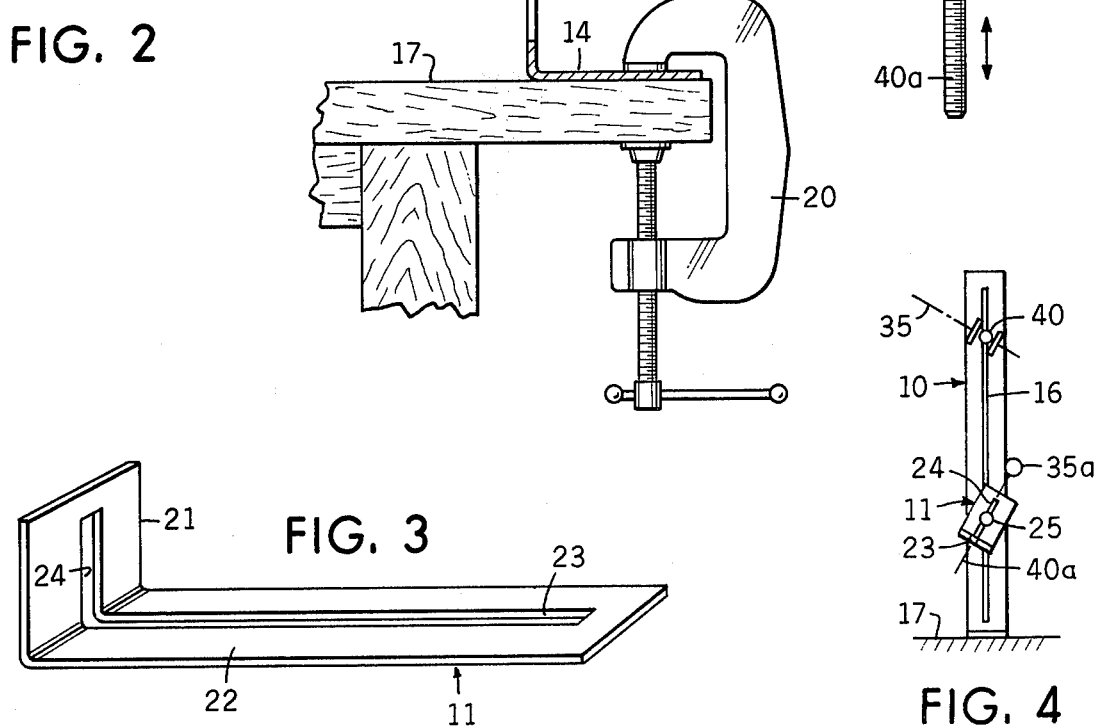

UNIVERSALLY ADJUSTABLE CLAMP

BACKGROUND OF THE INVENTION

This invention relates generally to a clamping device and particularly to a universal clamping device utilizing a pair of C-clamps each capable of independent translational and rotational movement.

Clamping devices are known which utilize two or more C-clamps mounted to a base structure and movable relative to each other in more than one direction. One such device provides a single transverse rail carried by a vertical post. The clamps are movable in a longitudinal direction along the rail and are also movable relative to each other in other directions by virtue of articulated arms connecting each clamp to the rail. The use of articulated arms to accomplish the relative movement renders the device complicated and therefore expensive.

Another such device utilizes a pair of independent rails each mounting two clamps. The individual clamps are movable longitudinally of the rail to which they are mounted and the rails are not connected but are movable relative to each other. However, the clamps in this device must be specially formed to suit the rail, which cooperates in the clamping action. The complicated, compatible configuration of the rails and the clamps renders the device expensive to manufacture.

The present device achieves greater versatility of movement than known devices in a manner neither disclosed nor suggested in the prior art.

SUMMARY OF THE INVENTION

This clamping device provides a pair of right-angularly related outstanding legs movable with respect to each other, each leg providing a mounting for a modified C-clamp so that each clamp is translationally movable in directions both parallel and perpendicular to its associated outstanding leg. In addition, each clamp is rotationally movable about an axis of its own, perpendicular to its clamping axis. This combined, substantially universal movement is achieved without the use of articulated members. Conventional C-clamps can readily be modified for use with this clamping device without requiring specially configured clamp and rail connections.

In addition to the above advantages, the structural arrangement of parts provides each clamp with a coarse adjustment in one direction and a fine adjustment in the other direction so that coarse and fine relative movement between the clamps is available in two right-angularly related directions. Moreover, the device is simple and inexpensive to manufacture and can be used by anyone without special instruction.

It is an object of this invention to provide a first angle bracket including an attachment leg for attachment to a base, and a perpendicular outstanding leg having an elongate slot therein; a second angle bracket including an attachment leg for attachment to the outstanding leg of the first angle bracket, and a perpendicular outstanding leg having an elongate slot therein; and fastener means connecting the attachment leg of the second angle bracket to the outstanding leg of the first angle bracket.

Another object is to provide the connection between said brackets by means of a pivot fastener which permits the outstanding leg of the second angle bracket to be moved vertically relative to the outstanding leg of the first angle bracket and clamped at a selected horizontal position, said fastener means permitting the second angle bracket to be orbitally adjusted relative to the first angle bracket.

It is another object to provide first and second clamps removably connected to associated first and second angle brackets, each clamp including a U-shaped body having opposed arms and a clamping member extensible between said arms, and each clamp including an elongate, threadedly adjustable member fixedly attached to the body at one end and having the other end received by the slot in the outstanding leg of the associated angle bracket for selective translational movement of the clamp for coarse adjustment toward and away from the outstanding leg of the other bracket, and fine adjustment toward and away from the outstanding leg of its own bracket. In addition, each clamp is rotatable about the longitudinal axis of its adjustable member, and each adjustable member includes means for selectively clamping it in position in its associated slot.

BRIEF DESCRIPTION OF THE DRAWING

FIG. 1 is an elevational view of the clamping device attached to a work table;

FIG. 2 is a perspective view of the vertical angle bracket;

FIG. 3 is a perspective view of the horizontal angle bracket; and

FIG. 4 is a schematic showing the relative positions of the clamping axes of the individual clamps.

DESCRIPTION OF THE PREFERRED EMBODIMENT

Referring now by characters of reference to the drawing and first to FIG. 1, it will be understood that the clamping device comprises essentially an ell-shaped bracket 10 having another ell-shaped bracket 11 attached thereto in movable relation. The brackets 10 and 11 constitute first and second angle brackets respectively, and each bracket has an associated adjustable clamp 12 or 13 mounted thereupon.

Bracket 10 includes an attachment leg 14 and a vertical outstanding leg 15 having an elongate slot 16. In the preferred embodiment the attachment leg 14 is clamped to a work table 17 by means of a conventional C-clamp 20, and said work table 17 provides a base for the clamping device as a whole. Bracket 11 also includes an attachment leg 21 and a horizontal outstanding leg 22 having an elongate slot 23 which extends to the junction of the legs 21 and 22. The attachment leg 21 is provided with an elongate slot 24 which, in the preferred embodiment, also extends to the junction of the legs 21 and 22 and communicates with slot 23.

The attachment leg 21 of bracket 11 is connected to the outstanding leg 15 of bracket 10 by a fastener means which includes a bolt 25. The bolt 25 extends through slots 16 and 24 and is provided with a wing nut 26 so that the attachment leg 21 can be clamped to the outstanding leg 15 at a selected vertical location of the horizontal outstanding leg 22. The fastener means thus provides relative sliding adjustment of the height of the bracket 11 and, in addition, provides for relative rotation of said bracket 11 about the pivot center defined by the longitudinal axis of the bolt 25.

The clamps 12 and 13, which constitute first and second clamps respectively, are modified C-clamps and are substantially identical. Clamp 12 includes a substantially U-shaped body 30 having opposed arms 31 and 32 and a bight portion 33. Arm 31 includes a threaded aperture 34 receiving a threadedly adjustable clamping member 35 therein, said member 35 having a movable jaw 36 at one end and a handle 37 at the other end. The handle 37 is rotated in the usual manner to move the clamping member 35 along its longitudinal clamping axis so that the movable jaw 36 moves toward and away from the fixed jaw 38 provided by the arm 32. Importantly, clamp 12 includes an elongate threaded rod 40, which is secured at one end as by welding to the body 33 and constitutes an adjustable threaded member. The longitudinal axis of the rod 40 is substantially perpendicular to the longitudinal clamping axis of the clamping member 35 and said rod 40 is received within the slot 16 of the outstanding leg 15 of the bracket 10 for selective vertical sliding movement of the rod 40, and therefore of the clamp 12, within said slot 16. A pair of wing nuts 41 provides a means of clamping the rod 40 to the vertical leg 15 at a selected elevation. In addition, the wing nuts 41 provide a means of extending the rod 40 and clamping it, at a selected angular position of the C-clamp 12 in a rotational plane substantially perpendicular to the longitudinal axis of the rod 40, and at a selected distance of said plane from the plane of the vertical outstanding leg 15 of the bracket 10. By this structural arrangement of parts the clamp 12 is provided with a rapid coarse vertical adjustment, and a relatively fine horizontal adjustment.

In the preferred embodiment the longitudinal axis of the rod 40 is substantially aligned with the clamping plane of the fixed jaw 38. This structural arrangement of parts provides that relatively thin sheet material or relatively small diameter tubular material, such as the workpiece W1 which is held between the jaws 36 and 38 as shown in FIG. 1 for welding to the workpiece W2 held by clamp 13, is rotated substantially about the longitudinal axis of said rod 40.

Clamp 13 is substantially identical to clamp 12 and for this reason corresponding parts are given the same reference numeral with the addition of the suffix $a$. Distinguishing from clamp 12 the adjustable, threaded rod 40$a$ of clamp 13 is received within the slot 23 of the outstanding leg 15 of bracket 11 for selective horizontal sliding movement of the rod 40$a$, and therefore of the clamp 13, within said slot 23. Wing nuts 41$a$ permit the rod 40$a$ to be clamped to the horizontal leg 22 at a selected position lengthwise of the slot 23. In addition, the wing nuts 41$a$ provide a means of extending the rod 40$a$ and clamping it, at a selected angular position of the C-clamp 13 in a rotational plane substantially perpendicular to the longitudinal axis of the rod 40$a$, and at a selected distance of said plane from the outstanding leg 22 of the bracket 11. The clamp 13 is thereby provided with a rapid coarse horizontal adjustment and a relatively fine vertical adjustment. The longitudinal axis of the rod 40$a$ is substantially aligned with the clamping plane of the fixed jaw 38$a$ so that a workpiece W2 is rotated substantially about the longitudinal axis of said rod 40$a$.

The operation of the device is believed to be clear from the foregoing description but will be briefly summarized. In the position shown in FIG. 1 the substantially flat clamp bodies 30 and 30$a$ are both disposed in the same vertical plane, and the clamping axes represented by the longitudinal axes of the clamping members 35 and 35$a$ each have a movement capability in two directions relative to the vertical and horizontal coordinates represented by the outstanding legs 15 and 22 of brackets 10 and 11 respectively. For example, the clamp 12 can be moved vertically within the vertical slot 16 and horizontally by means of threadedly extending or retracting the adjustable rod 40; clamp 13 can be moved horizontally within the horizontal slot 23 and vertically by means of threaded rod 40$a$. Thus, each clamp is provided with complementary fine and coarse adjustments so that the relative positions of the clamping jaws can be adjusted both accurately and rapidly. In addition, the clamps 12 and 13 can be rotated angularly about the longitudinal axes of their associated rods 40 and 40$a$ and, because of the substantial alignment of these rods with their respective jaws, the clamping action can be maintained substantially at the center of rotation.

Importantly, in addition to the above movement of the clamps 12 and 13 the clamping axis of the clamp 13 can be orbited about a pivot center defined by the pivot bolt 25 connecting the brackets 10 and 11 together as shown in FIG. 4. Further, because of the provision of the slot 24 in the attachment leg 21 of the bracket 11 the orbital radius can be varied rapidly within a range defined by the length of said slot 24. The bracket 11 is also movable vertically within the vertical slot 16 provided by the bracket 10.

It can be thus seen that the relative disposition of the jaws of the clamps 12 and 13 is in each case adjustable in several directions to provide substantially universal relocation of the jaws to hold workpieces and parts of workpieces such as W1 and W2 in a wide range of selected positions.

I claim as my invention:

1. An adjustable clamping device for attachment to a base, the device comprising:
    a. a first angle bracket including an attachment leg for attachment to the base and a substantially perpendicular outstanding leg having an elongate slot therein,
    b. a second angle bracket including an attachment leg for attachment to the outstanding leg of the first angle bracket and a substantially perpendicular outstanding leg having an elongate slot therein,
    c. fastener means connecting the attachment leg of the second angle bracket to the outstanding leg of the first angle bracket,
    d. a first clamp including:
        1. a substantially U-shaped body having opposed arms,
        2. a threaded clamping member having a clamping axis extending between said arms,
        3. an elongate, threadedly adjustable member having a longitudinal axis and having one end secured to the body and the other end received by the slot in the outstanding leg of the first angle bracket for selective translational and rotational movement of said adjustable member in said slot to move the first clamp for a relative coarse sliding adjustment toward and away from the outstanding leg of the second angle bracket and to rotate the clamping axis in a plane substantially perpendicular to the longitudinal axis of said adjustable member, and
        4. means for selectively fixing the location of the adjustable member in said slot and for enabling movement of the adjustable member and first clamp for a relative fine threaded adjustment toward and away from the outstanding leg of the first bracket to which it is attached, and e. a second clamp including,
  1. a substantially U-shaped body having opposed arms,
  2. a threaded clamping member having a clamping axis extending between said arms,
  3. an elongate threadedly adjustable member having a longitudinal axis and having one end secured to the body and the other end received by the slot in the outstanding leg of the second angle bracket for selective translational and rotational movement of said adjustable member in said slot to move the second clamp for a relative coarse sliding adjustment toward and away from the outstanding leg of the first angle bracket and to rotate the clamping axis in a plane substantially perpendicular to the longitudinal axis of said adjustable member, and
  4. means for selectively fixing the location of the adjustable member in said slot and for enabling movement of the adjustable member and second clamp for a relative fine threaded adjustment toward and away from the outstanding leg of the second bracket to which it is attached.

2. A clamping device as defined in claim 1, in which:

f. each clamp includes a fixed clamping jaw having a clamping plane perpendicular to the clamping axis, and g. the longitudinal axis of the associated adjustable member is substantially aligned with said clamping plane for rotating a workpiece clamped to the jaw substantially about the longitudinal axis of the adjustable member and maintaining the clamping action substantially at the center of rotation.

* * * * *